(12) United States Patent
Izumo et al.

(10) Patent No.: US 9,335,202 B2
(45) Date of Patent: May 10, 2016

(54) WEIGHING APPARATUS THAT QUANTIFIES AMOUNT OF IMPACT

(71) Applicants: Naoto Izumo, Kitamoto (JP); Yuji Fukami, Kitamoto (JP)

(72) Inventors: Naoto Izumo, Kitamoto (JP); Yuji Fukami, Kitamoto (JP)

(73) Assignee: A&D Company, Limited, Tokyo (JP)

(*) Notice: Subject to any disclaimer, the term of this patent is extended or adjusted under 35 U.S.C. 154(b) by 85 days.

(21) Appl. No.: 14/364,649

(22) PCT Filed: Oct. 17, 2012

(86) PCT No.: PCT/JP2012/076774
§ 371 (c)(1),
(2) Date: Jun. 11, 2014

(87) PCT Pub. No.: WO2013/088835
PCT Pub. Date: Jun. 20, 2013

(65) Prior Publication Data
US 2014/0332290 A1 Nov. 13, 2014

(30) Foreign Application Priority Data
Dec. 14, 2011 (JP) .................................. 2011-273601

(51) Int. Cl.
*G01G 23/01* (2006.01)
*G01G 7/02* (2006.01)

(52) U.S. Cl.
CPC . *G01G 23/01* (2013.01); *G01G 7/02* (2013.01)

(58) Field of Classification Search
CPC ........ G01G 7/02; G01G 23/01; G01G 23/005
See application file for complete search history.

(56) References Cited

U.S. PATENT DOCUMENTS

| 4,553,619 | A | * | 11/1985 | Fujinaga | G01G 23/3707 177/1 |
| 5,750,937 | A | * | 5/1998 | Johnson | G01G 23/3707 177/199 |
| 5,864,783 | A | * | 1/1999 | Struck | G01G 19/10 340/901 |
| 6,237,427 | B1 | * | 5/2001 | Helfrich | G01F 1/28 198/502.2 |
| 6,956,175 | B1 | * | 10/2005 | Daly | G01G 19/445 177/1 |

(Continued)

FOREIGN PATENT DOCUMENTS

| JP | 2001-194220 | 7/2001 |
| JP | 2002-340665 | 11/2002 |
| JP | 2005-140517 | 6/2005 |

OTHER PUBLICATIONS

International Search Report PCT/JP2012/076774 dated Oct. 17, 2012.

*Primary Examiner* — Peter Macchiarolo
*Assistant Examiner* — Natalie Huls
(74) *Attorney, Agent, or Firm* — Roberts Mlotkowski Safran & Cole, PC (57) ABSTRACT

A weighing apparatus is provided that quantifies an impact load based on an electrical output from a mass sensor to prevent damage to the mass sensor by disclosing the degree of impact to a user. The weighing apparatus includes a weighing unit on which an object is placed and a mass sensor that receives the mass×acceleration of gravity of the object as a load and measures mass from an electrical signal corresponding to displacement of an internal structure of the apparatus. The apparatus quantifies and records the amount of the displacement, and determines acceleration by a numerical calculation from the displacement data. The obtained acceleration quantifies the amount of impact applied on the weighing apparatus by the object, and may be used to warn the user when the weighing apparatus is in danger of damage.

6 Claims, 6 Drawing Sheets

(56) References Cited

U.S. PATENT DOCUMENTS 7,497,137 B2 * 3/2009 Tellenbach ............. G01G 21/30
177/1

2010/0200307 A1 * 8/2010 Toms ................... G01G 19/042
177/163

2015/0241266 A1 * 8/2015 Riefle-Weber ........... G01G 7/02
177/1

* cited by examiner

WEIGHING APPARATUS THAT QUANTIFIES AMOUNT OF IMPACT

TECHNICAL FIELD

The present invention relates to a weighing apparatus to measure mass, and particularly concerns a weighing apparatus which receives mass×acceleration of gravity as a load, and electrically detects displacement of an internal structure of the apparatus at that time to measure mass.

BACKGROUND ART

As this type of weighing apparatus, for example, an electromagnetic balance type electronic balance has been provided. In the electromagnetic balance type weighing apparatus, when a weighing object is placed on a weighing pan, its load is transmitted to a beam being a load transmission mechanism, and the beam turns about a fulcrum, and the side connecting with an electromagnetic unit is also displaced due to the force. The displacement is sensed by an output voltage from a displacement detection sensor, current flows to a coil of the electromagnetic unit so as to cancel such displacement and balance said beam, and mass is measured by measuring the quantity of the electricity (Patent Literature 1).

Mass sensors to be used for weighing apparatuses include load cell types that use displacement of strain gauges and electrostatic capacitance types that measure displacement based on electrostatic capacitance of the sensors and weighing objects, besides the electromagnetic balance types described above, and all mass sensors are the same in the point of receiving mass×acceleration of gravity as a load, and measures mass from an electrical signal corresponding to displacement of an internal structure of the apparatus at that time.

Such weighing apparatuses have been recently introduced into production lines to perform weighing automatically such as production facilities, and particularly, on a production line called an automated machine, a weighing object is automatically placed on the weighing apparatus and mechanically measured by use of a production fixture using an actuator such as a motor or air cylinder.

CITATION LIST

Patent Literature

Patent Literature 1: Japanese Published Unexamined Patent Application No. 2002-340665 (paragraph [0012], FIG. 1, etc.)

SUMMARY OF INVENTION

Technical Problem

However, when the conventional weighing apparatus is used for the production line described above, unlike by a manual operation, contact between the weighing object and weighing pan cannot be judged in the automated machine, and accordingly, the weighing object cannot be gently placed on the weighing pan. Usually, for the weighing pan of the weighing apparatus, a shock absorbing mechanism (commonly called a shock absorber) consisting of leaf springs or coil springs has been provided as a counter measure against overload, however, it is known that such a shock absorber functions in response to a quasi-static load that is applied slowly, but does not function when acceleration to be applied to the weighing pan is a problem, that is, to such an impact load that causes damage before energy is absorbed.

Therefore, an impulsive load may have been applied to the mass sensor due to the adoption of an automated machine, which caused damage in many cases. To cope therewith, a user has no way of judging whether the usage on the production line is in an impulsive manner, and a problem has arose that the user grows uncertain of the weighing apparatus itself as to why damage to the mass sensor occurs despite his/her measuring mass within a prescribed weighing capacity.

The present invention has been made in view of the problems of the conventional techniques, and an object thereof is, first, to provide a method of quantifying an impact load to be applied to a weighing apparatus based on an electrical output from a mass sensor, and second, to provide a weighing apparatus which prevents damage to the mass sensor by disclosing that degree of impact to a user.

Solution to Problem

In order to achieve the above-mentioned object, a first aspect of the invention includes an impact load quantifying method including, by a weighing apparatus including a weighing unit on which a weighing object is placed and a mass sensor that receives its mass×acceleration of gravity as a load and measures mass from an electrical signal corresponding to displacement of an internal structure of the apparatus at that time, quantifying and recording an amount of the displacement, and determining acceleration by a numerical calculation from said displacement amount data.

A second aspect of the invention includes an impact load quantifying method, in which the weighing apparatus according to the first aspect of the invention is an electronic balance including an electromagnetic balance type mass sensor, in which when a measuring object is placed on the weighing unit, a load transmission mechanism being the displacement unit is displaced via a fulcrum, and displaced so as to maintain a balanced state by an electromagnetic unit connected with said load transmission mechanism, and said displacement amount is detected by a voltage output of a displacement detection sensor, and quantifies an output voltage of the displacement detection sensor, records said voltage data as displacement amount data corresponding thereto, and determines acceleration by a numerical calculation from said displacement amount data.

A weighing apparatus according to a third aspect of the invention includes a weighing unit on which a weighing object is placed and a mass sensor that receives its mass× acceleration of gravity as a load and measures mass from an electrical signal corresponding to displacement of an internal structure of the apparatus at that time, and includes an impact load quantifying means that quantifies and records an amount of the displacement, and determines acceleration by a numerical calculation from said displacement amount data.

In a fourth aspect of the invention, the weighing apparatus according to the third aspect of the invention is an electronic balance including an electromagnetic balance type mass sensor, in which when a measuring object is placed on the weighing unit, a load transmission mechanism being the displacement unit is displaced via a fulcrum, and displaced so as to maintain a balanced state by an electromagnetic unit connected with said load transmission mechanism, and said displacement amount is detected by a voltage output of a displacement detection sensor, including an impact load quantifying means that quantifies an output voltage of the displacement detection sensor, records said voltage data as displacement amount data corresponding thereto, and determines acceleration by a numerical calculation from said displacement amount data.

A fifth aspect of the invention is the weighing apparatus according to the third or fourth aspect of the invention, including a degree of impact transmitting means that calculates from the acceleration obtained by the impact load quantifying means an impact value corresponding thereto, and notifies a user.

Advantageous Effects of Invention

According to the first and third aspects of the invention, most of the mass sensors to be used for weighing apparatuses have a function of receiving mass×acceleration of gravity as a load and outputting an electrical signal corresponding to displacement of an internal structure of the apparatus at that time. Accordingly, by quantifying and recording the amount of displacement of the displacement unit as displacement amount data from such an electrical signal, and detecting the displacement value as a change in the displacement amount per unit time, a "velocity" in response to the load of the mass sensor can be determined. Further, by detecting the obtained velocity as a change in velocity per unit time, an "acceleration" in response to the load of the mass sensor can be determined.

According to the second and fourth aspects of the invention, in the electromagnetic balance type mass sensor, displacement is detected as voltage. Because the output voltage has a proportional relationship with a displacement amount of the load transmitting mechanism when a load is applied, by quantifying such voltage for recording as displacement amount data, and detecting the obtained displacement value, a "velocity" in response to the load of the mass sensor can be determined. Further, by detecting the obtained velocity, an "acceleration" in response to the load of the mass sensor can be determined.

As above, the acceleration obtained by a numerical calculation from the displacement amount indicates the degree of impact to be applied to the weighing apparatus, that is, an acceleration received by the mass sensor. Accordingly, the greater the degree of impact to be applied to the weighing unit, the greater acceleration is detected, so that whether the weighing apparatus is used in an impulsive manner, which has conventionally been unclear, can be quantified (represented by numerical values).

According to the fifth aspect of the invention, for an acceleration quantified by the impact load quantifying means, by measures such as setting an acceleration that is obtained in the case of a manual operation as an already-known reference value, the degree of impact (level of impact) can also be quantified. Moreover, disclosing this as an impact value allows easy recognition of whether the weighing apparatus is used in a harsh manner. Thus, damage to the mass sensor can be prevented, and the uncertainty having been felt by the user can also be eliminated.

DESCRIPTION OF EMBODIMENTS

Figure 1:
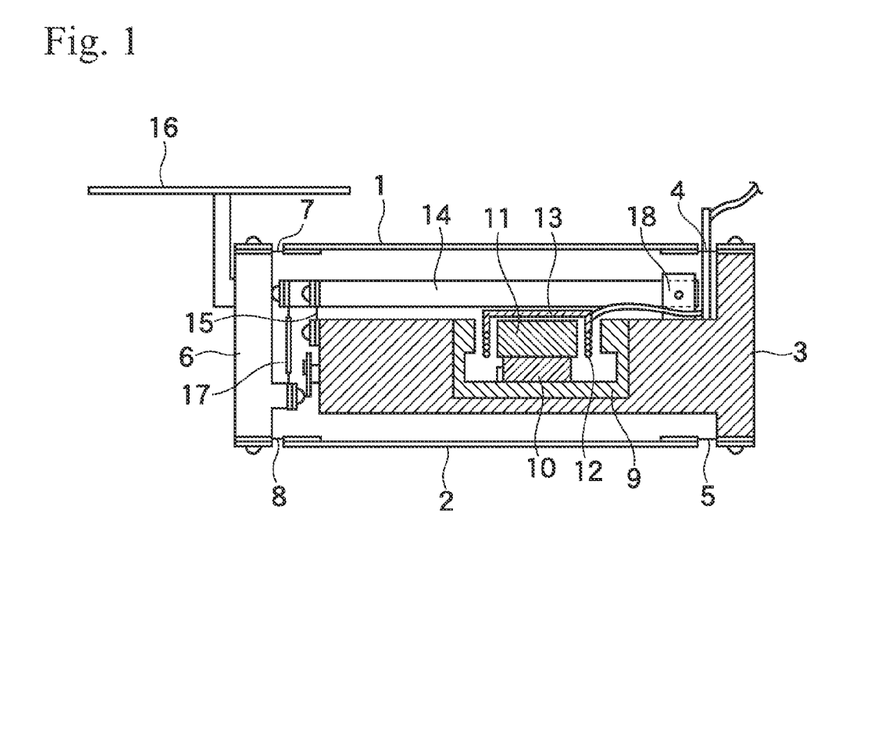
FIG. 1 is a sectional view of a mechanical section of an electromagnetic balance type weighing apparatus, showing an example of an implementation object of the present invention.
Figure 2:
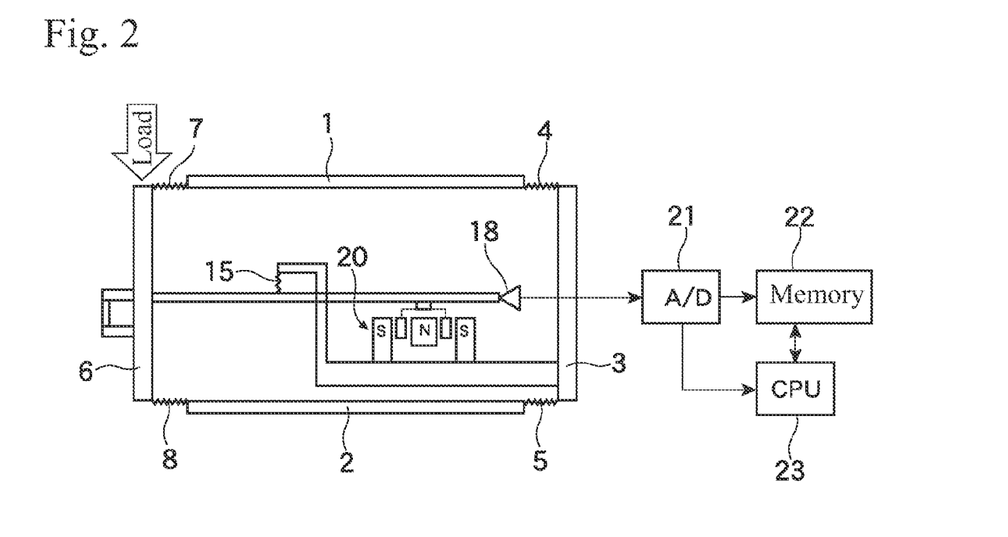
FIG. 2 is a simplified configuration diagram of the above-mentioned mechanical section.

Next, preferred embodiments of the present invention will be described based on examples of application, as a weighing apparatus, to an electronic balance including an electromagnetic balance type mass sensor. FIG. 1 is a sectional view of a mechanical section of an electromagnetic balance type weighing apparatus, showing an example of an implementation object of the present invention, and FIG. 2 is a simplified configuration diagram of the above-mentioned mechanical section.

Reference numeral 1 denotes an upper sub-rod, and reference numeral 2 denotes a lower sub-rod disposed parallel to the upper sub-rod, and one-side ends of both sub-rods 1 and 2 are respectively connected via springs 7 and 8 to a frame 3 that supports the entire mechanism. On the other hand, the other-side ends of these upper and lower sub-rods 1 and 2 are connected so as to be movable up and down with a floating frame 6 via springs 7 and 8 having the same configuration as the above. The frame 3, the upper and lower sub-rods 1 and 2, and the floating frame 6 compose a Roberval mechanism. The floating frame 6 has a weighing pan (weighing unit) 16 placed thereon, and thereon a weighing object is placed.

On the other hand, the frame 3 stores therein an electromagnetic unit 20. The electromagnetic unit 20 consists of a yoke 9, an electromagnet 10 disposed in the yoke 9, a pole piece 11 located at an upper portion of the electromagnet 10, and a coil 12 located around the pole piece 11. The coil 12 is wound around a bobbin 13, and such a bobbin 13 is fixed to a beam 14 (load transmission mechanism being a displacement unit), and arranged so as to rise and fall together with the beam 14. The beam 14 is connected to the frame 3 by a support bearing 15, and is also arranged so as to turn about the support bearing 15 used as a fulcrum. In addition, there is an arrangement for a turn of the beam 14 by stoppers 19 provided at upper and lower positions of the beam near an optical sensor 18 so as not to cause displacement at a prescribed value or more.

In the above-mentioned configuration, when a weighing object is placed on the weighing pan 16, its load is transmitted to the floating frame 6, and guided by the Roberval mechanism while being transmitted to the beam 14 via a commonly called sling (tension bearing) 17 to apply force to the beam 14 so as to turn about the support bearing 15 used as a fulcrum, and the beam 14 is displaced in response to the load on the pan. The force is transmitted to the coil 12 via the bobbin 13 connected to the beam 14, and intends to displace the coil 12. Such displacement is detected based on an output voltage from the optical sensor (displacement detection sensor) 18 consisting of an inferred LED and a photodiode, and current is supplied to the coil 12 so that an electromagnetic force is generated in a direction to eliminate the displacement (direction to reach an original balanced state before the load is applied). By measuring the current supplied to the electromagnetic unit 20, mass of the weighing object is measured. The weighted value thus measured is displayed on a display unit 24 (not shown) of the balance.

In addition to the conventional configuration as above, for the optical sensor 18, an A/D converter 21 to A/D-convert a sensor output voltage and a memory 22 connected to the A/D converter 21, and a CPU 23 connected to the A/D converter 21 and the memory 22 for an impact load quantifying means to be described later are provided. Moreover, the electromagnetic balance type electronic balance of the present application includes an impact load quantifying means and a degree of impact transmitting means in the CPU 23. Description thereof will be specifically given together with a flowchart to be described later.

Figure 3:
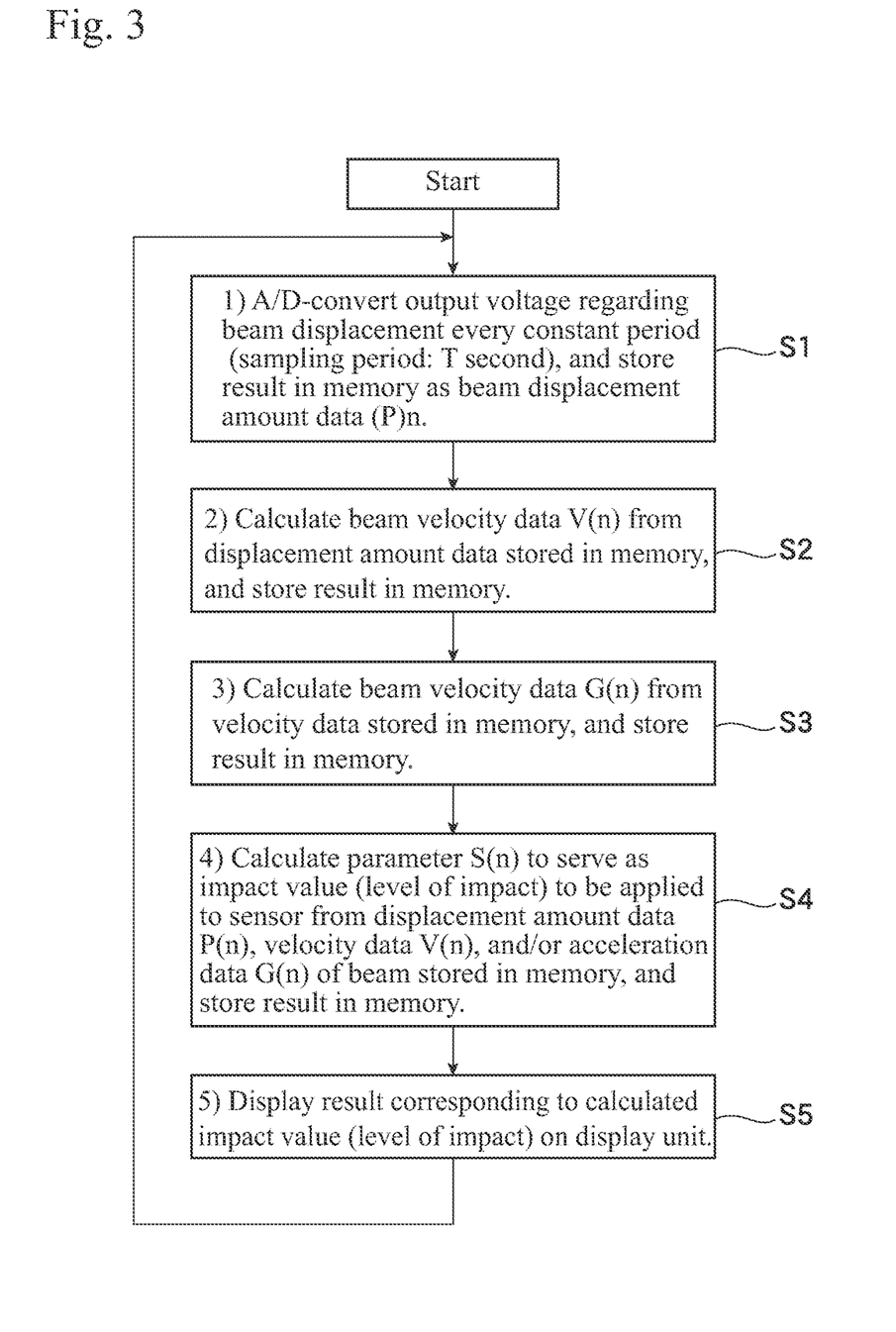
FIG. 3 is an operation flowchart for impact load quantification.

The operation in an impact load detection mode of the electromagnetic balance type electronic balance of the present application will be described based on a flowchart shown in FIG. 3.

When it enters the impact load detection mode, first, in step 1, an output voltage from the optical sensor 18 regarding displacement of the beam 14 is A/D-converted with a constant period T (sampling period, as an example, T=2 msec), and the result is stored in the memory 22 as displacement amount data P(n) of the beam 14. The output voltage and beam displacement have a proportional relationship on a product by product basis depending on design (for example, an output voltage of 640 mV in a product corresponds to displacement of 0.22 mm.)

Next, in step 2, velocity data V(n) of the beam 14 is calculated by the CPU 23 from the displacement amount data P(n) stored in the memory 22, and the result is stored in the memory 22. The calculation of the velocity data V(n) is performed, as an example, by the following formula (1) in which a differential is approximated by a difference.

$$V(n)=\{P(n)-P(n-1)\}/T \quad (1)$$

Here, P(n) represents current displacement data, P(n−1) represents last displacement data, and T represents a sampling period.

Next, in step 3, acceleration data G(n) of the beam 14 is calculated by the CPU 23 from the velocity data V(n) stored in the memory 22, and the result is stored in the memory 22. The calculation of the acceleration data G(n) is performed, as an example, by the following formula (2) in which a differential is approximated by a difference.

$$G(n)=\{V(n)-V(n-1)\}/T \quad (2)$$

Here, V(n) represents current velocity data, V(n−1) represents last velocity data, and T represents a sampling period.

Next, in step 4, a parameter S(n) to serve as an impact value to be applied to the mass sensor is calculated by the CPU 23 from the displacement amount data P(n), velocity data V(n), and/or acceleration data G(n) of the beam 14 stored in the memory 22, and the result is stored in the memory 22. The calculation of the impact value S(n) is performed, as an example, by the following (i) to (iv).

(i) With beam displacement not less than prescribed, there is a possibility that the beam 14 has hit the stoppers 19 to receive an impact. Thus, the displacement amount data P(n) is adopted as a parameter of an impact value S(n) (Formula (3)).

$$S1(n)=|a \times P(n)| \quad (3)$$

Here, a represents an adjustment factor.

(ii) As expressed by F=ma (F: force, m: mass, a: acceleration), it can be understood that the acceleration is related to the impact force because the mass of the beam 14 is constant. Accordingly, the acceleration data G(n) is adopted as a parameter of an impact value S(n) (Formula (4)).

$$S2(n)=|b \times G(n)| \quad (4)$$

Here, b represents an adjustment factor.

(iii) Next, an impact value S(n) is calculated from S1(*n*) and S2(*n*).

The calculation of the impact value S(n) is performed, as an example, by the following formula (5).

$$S(n)=S1(n)+S2(n) \quad (5)$$

(iv) In addition, when the impact value S(n) is calculated from S1(*n*) and S2(*n*), it is also preferable to include a temporal factor according to necessity.

Next, in step 5, a result corresponding to the calculated impact value S(n) is displayed on the display unit 24 of the electronic balance. Thereafter, the operation returns to step 5, a display of an impact value S(n) is repeated. As a method of disclosing the impact value S(n), the following method can be considered for instance.

(I) For a quantified impact value S(n), an impact value S(n) obtained from acceleration data G(n) obtained in the case of a manual operation is set as an already-known reference value, and in the case of exceeding this, the level of impact is displayed by a level meter. The more bar displays, the greater the degree of impact, and the less bar displays, the smaller degree of impact.

(II) When the impact value S(n) exceeds a limit value prescribed by a load test in design, a warning is displayed or a warning sound is issued for a fixed time.

In the above, step 1 to step 3 correspond to an impact load quantifying means, and step 4 to step 5 correspond to a degree of impact transmitting means.

FIG. 4 to FIG. 8 show graphs of data obtained in the impact load detection mode described above, using an electromagnetic balance type electronic balance with a weighing capacity of 6100 g, when a weight (weighing object) of 3 kg is manually placed and when a speed controller of an automated machine is set to low speed and the weight is automatically loaded.

Figure 4:
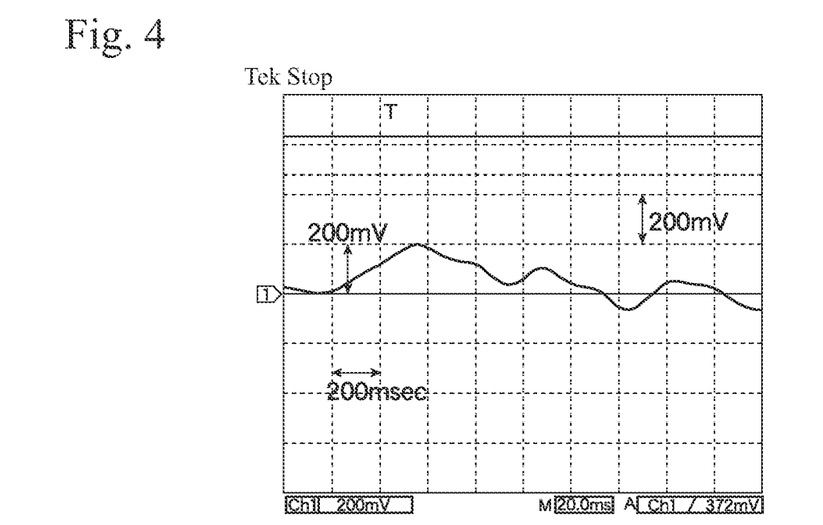
FIG. 4 is a graph showing changes in voltage value when a weighing object is manually placed.
Figure 5:
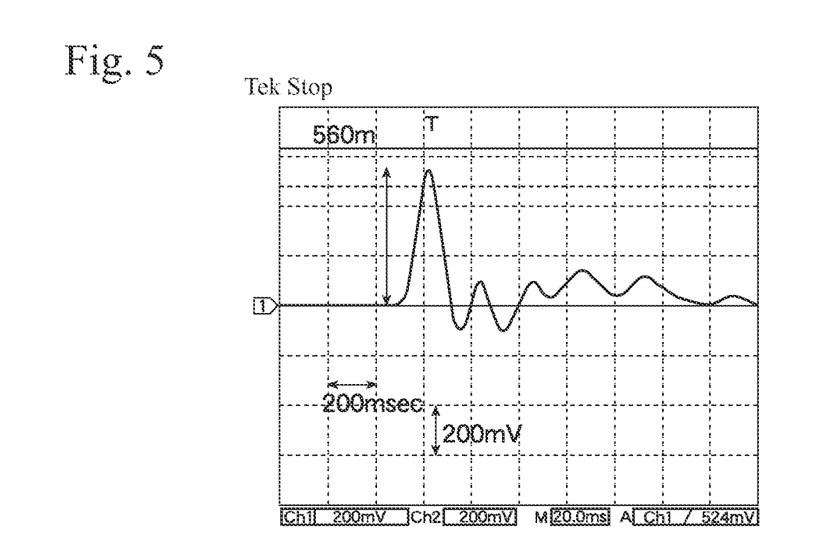
FIG. 5 is a graph showing changes in voltage value when a weighing object is placed by an automated machine.

First, FIG. 4 is a graph showing changes in voltage value when a weighing object is manually placed, and FIG. 5 is a graph showing changes in voltage value when a weighing object is placed by an automated machine. The horizontal axis shows the time [sec], and the vertical axis shows the output voltage [mV] from the optical sensor 18. Conventionally, such output voltage from the optical sensor 18 has been consistently used only for sensing displacement of the beam 14, and therefore has never been monitored in this manner. In the present application, however, such output voltage is actively scaled, and effectively used as a material for quantifying an impact load.

Figure 6:
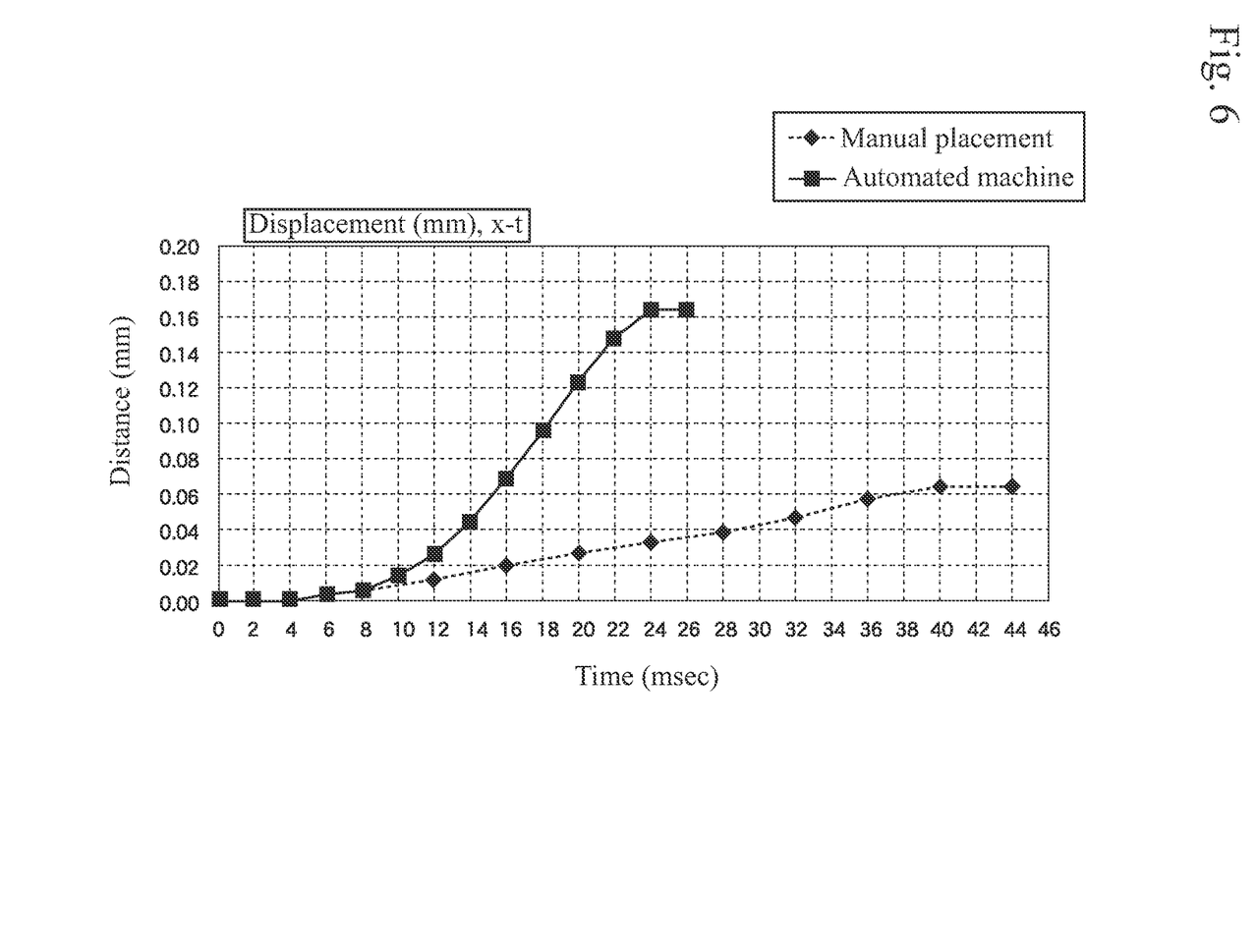
FIG. 6 is a graph of voltage values when a weighing object is manually placed and when placed by an automated machine, converted to displacement values.

Next, FIG. 6 is a graph of voltage values when a weighing object is manually placed and when placed by an automated machine, converted to displacement values, that is, the voltage values in FIG. 4 and FIG. 5 respectively converted to displacement values. The horizontal axis shows the time [msec], and the vertical axis shows the displacement value (distance) [mm] of the beam 14.

Figure 7:
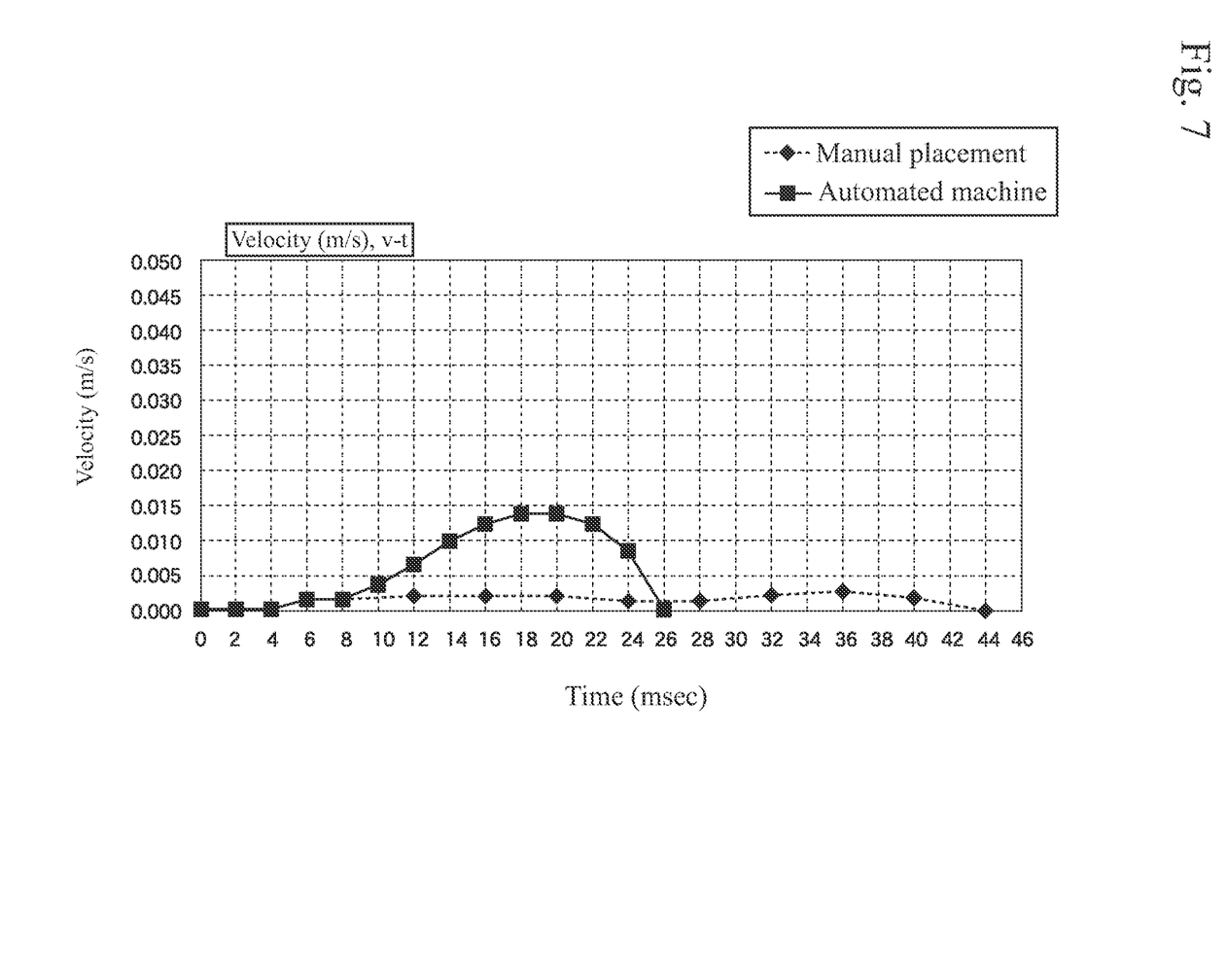
FIG. 7 is a graph of displacement values when a weighing object is manually placed and when placed by an automated machine, converted to velocity values.

Next, FIG. 7 is a graph of displacement values when a weighing object is manually placed and when placed by an automated machine, converted to velocity values, that is, the displacement values in FIG. 6 respectively converted to velocity values. The horizontal axis shows the time [msec], and the vertical axis shows the velocity value (distance) [m/s] of the beam 14.

Figure 8:
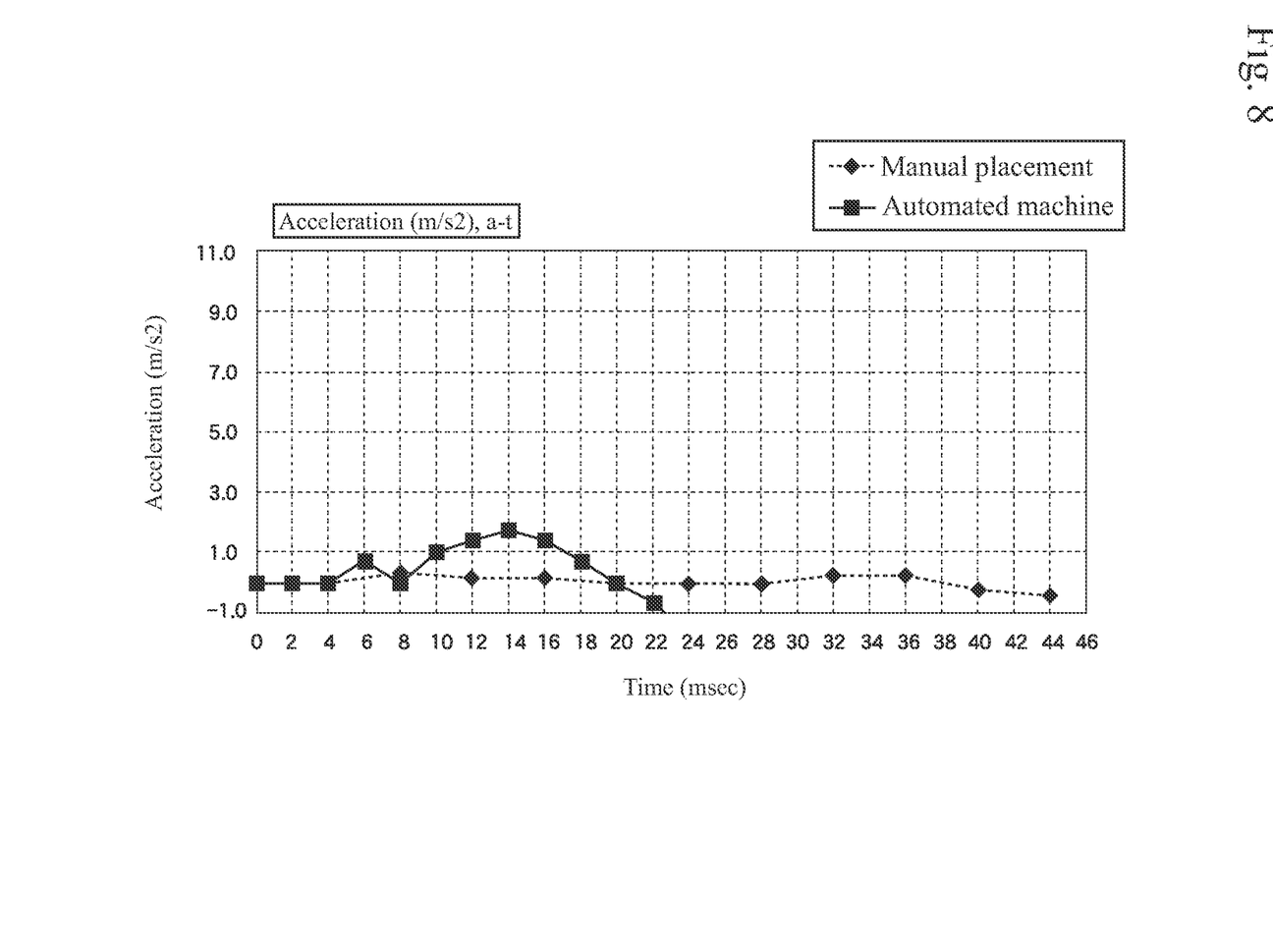
FIG. 8 is a graph of velocity values when a weighing object is manually placed and when placed by an automated machine, converted to acceleration values.

Next, FIG. 8 is a graph of velocity values when a weighing object is manually placed and when placed by an automated machine, converted to acceleration values, that is, the acceleration values in FIG. 7 respectively converted to acceleration values. The horizontal axis shows the time [msec], and the vertical axis shows the acceleration value (distance) [m/s$^2$] of the beam 14.

A comparison of the finally obtained acceleration values shows that it is almost constant at approximately 0.3 m/s$^2$ in the case of manual placement, whereas in the case of automatic loading, it has reached 1.7 m/s$^2$ at the maximum. A load to be detected at maximum acceleration in automatic loading is equivalent to 3 kgf×(1.7/0.3)=17 kgf when converted to a manually placed static load, which shows that an instantaneous stress onto the mass sensor exceeds the prescribed weighing capacity, and this is a harsh condition for the balance.

According to the present example, in the electromagnetic balance type mass sensor, displacement is detected as an output voltage from the optical sensor 18. Because the output voltage has a proportional relationship with a displacement amount of the beam 14 when a load is applied, by quantifying such voltage for recording as displacement amount data P(n), and subjecting the same to a second order differential (numerical calculation), acceleration data V(n) in response to the load of the mass sensor can be determined. This acceleration indicates an acceleration received by the mass sensor, that is, corresponds to the degree of impact to be received by the mass sensor of the weighing apparatus. Thus, as a result of the value of acceleration V(n) being specifically quantified by the impact load quantifying means, whether the weighing apparatus is used in an impulsive manner, which has conventionally been unclear, can be quantified. Further, as a result of including the degree of impact transmitting means along with the impact load quantifying means, an impact value S(n) can also be quantified from a quantified acceleration V(n). Moreover, disclosing this to the user allows easy recognition of the fact that the adoption of an automated machine has caused an impulsive usage of the balance even when a mass within the prescribed weighing capacity is being measured, and thus by measures such as having the settings of the automated machine changed, damage to the mass sensor can be prevented, and the uncertainty having been felt by the user can also be eliminated.

Although, in the above-described example, description has been given for an example of the weighing apparatus loaded with an electromagnetic balance type mass sensor, even a weighing apparatus loaded with a load cell type or electrostatic capacitance type mass sensor can similarly quantify an impact load. All mass sensors are the same in the point of receiving mass×acceleration of gravity as a load when a measuring object is placed on the weighing pan (weighing unit). Moreover, in the load cell type, because an output voltage associated with a change in resistance value of the strain gauge resulting from displacement of the strain element (displacement unit) is converted to a load, the displacement amount is determined from such output voltage (electrical signal). In the electrostatic capacitance type, because displacement is measured based on electrostatic capacitance of the sensor and weighing object and the displacement amount is converted to a load after conversion to a voltage, a displacement amount is directly obtained from an electrical signal. That is, because displacement amount data P(n) can be obtained by either type, from such displacement amount data P(n), velocity data V(n) can be calculated in the same manner as in the foregoing step 2, acceleration data G(n) can be calculated in the same manner as in step 3, an impact value S(n) can be calculated in the same manner as in the foregoing step 4, and this can be disclosed in the same manner as in step 5. Thus, the method of detecting an impact load and the method of notifying the same of the present invention can be applied to any weighing apparatus as long as it is loaded with a mass sensor of a type that includes a mechanism to receive mass×acceleration of gravity as a load, and measure mass from an electrical signal corresponding to displacement of an internal structure of the apparatus at that time, without limitation to the electromagnetic balance types.

REFERENCE SIGNS LIST

14 Beam (load transmission mechanism being a displacement unit)
15 Support bearing (fulcrum)
16 Weighing pan (weighing unit)
18 Optical sensor (displacement detection sensor)
20 Electromagnetic unit
22 Memory
23 CPU

The invention claimed is:

1. A weighing apparatus including a weighing unit on which a weighing object is placed and a mass sensor that receives its mass×acceleration of gravity as a load and measures mass from an electrical signal corresponding to displacement of an internal structure of the apparatus at that time, comprising
impact load quantifying means that quantifies and records an amount of the displacement, determines acceleration by a numerical calculation from said displacement amount data, and records said acceleration as a degree of impact received by the mass sensor on placement, for judging whether the measurement apparatus is used in an impulsive manner by a comparison with a value of a manually placed static load.

2. The weighing apparatus according to claim 1, wherein the measurement apparatus is an electronic balance including an electromagnetic balance type mass sensor, in which
when a measuring object is placed on the weighing unit, a load transmission mechanism being the displacement unit is displaced via a fulcrum, and displaced so as to maintain a balanced state by an electromagnetic unit connected with said load transmission mechanism, and said displacement amount is detected by a voltage output of a displacement detection sensor,
comprising impact load quantifying means that quantifies an output voltage of the displacement detection sensor, records said voltage data as displacement amount data corresponding thereto, determines acceleration by a numerical calculation from said displacement amount data, and records said acceleration as a degree of impact received by the displacement detection sensor on placement, for judging whether the measurement apparatus is used in an impulsive manner by a comparison with a value of a manually placed static load.

3. The weighing apparatus according to claim 2, comprising degree of impact transmitting means that calculates from the acceleration obtained by the impact load quantifying means an impact value corresponding thereto, and notifies a user whether the measurement apparatus is used in an impulsive manner.

4. The weighing apparatus according to claim 2, wherein the degree of impact is quantified.

5. The weighing apparatus according to claim 1, comprising degree of impact transmitting means that calculates from the acceleration obtained by the impact load quantifying means an impact value corresponding thereto, and notifies a user whether the measurement apparatus is used in an impulsive manner.

6. The weighing apparatus according to claim 1, wherein the degree of impact is quantified.

* * * * *